Figure 1:
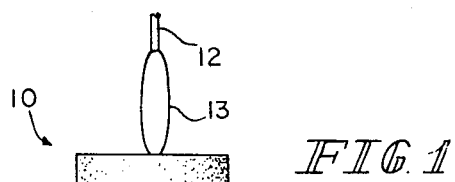

United States Patent [19]
Klein et al.

[11] 3,967,000
[45] June 29, 1976

[54] RISER PROTECTION FOR ANODES

[75] Inventors: Gerhart P. Klein, Manchester; Milton Kallianidis, Brockton, both of Mass.

[73] Assignee: P. R. Mallory & Co., Inc., Indianapolis, Ind.

[22] Filed: June 13, 1974

[21] Appl. No.: 479,052

[52] U.S. Cl................................. 427/58; 427/79; 427/80; 427/195; 427/197; 427/259; 427/261; 427/265; 427/352; 427/353; 427/421; 427/430; 427/435; 317/242; 317/258
[51] Int. Cl.²...................... B05D 5/12; B05D 3/00
[58] Field of Search............. 117/201, 212, 5.5, 113, 117/102 R; 317/104, 242, 258; 427/58, 79, 80, 197, 195, 259, 261, 265, 272, 282, 352, 353, 421, 430, 435

[56] References Cited
UNITED STATES PATENTS

| 3,055,777 | 9/1962 | Grad | 117/5.5 |
|---|---|---|---|
| 3,065,107 | 11/1962 | Hanink et al. | 117/5.5 |
| 3,139,352 | 6/1964 | Coyner | 117/5.5 |
| 3,283,117 | 11/1966 | Holmes et al. | 117/105.2 |
| 3,337,428 | 8/1967 | Wright | 117/113 |
| 3,502,491 | 3/1970 | Orth | 117/38 |
| 3,523,067 | 8/1970 | Baird-Kerr et al. | 117/5.5 |
| 3,573,949 | 4/1971 | Sharon | 117/5.5 |
| 3,583,932 | 6/1971 | Benton | 117/38 |
| 3,817,782 | 6/1974 | Klein et al. | 117/113 |

*Primary Examiner*—Michael F. Esposito
*Attorney, Agent, or Firm*—Hoffmann, Meyer & Hanson

[57] ABSTRACT

A protective layer containing polytetrafluoroethylene (PTFE) is provided over the riser of an anode having a porous film-forming metal anode body to render the riser non-wetting to a solution of manganese nitrate and thereby help prevent the formation of $MnO_2$ on the riser during the subsequent pyrolysis step in the process of making a capacitor. The protective layer also helps to prevent mechanical damage to the anode during assembly of the capacitor. The protective layer over the anode riser may be applied by means such as dipping a wetted anode in a suspension containing particulate PTFE or by masking the anode body with a liquid and then spraying the riser with binderless material containing PTFE. The preferred embodiment employs high pressure spraying of the material containing PTFE over the anode riser.

8 Claims, 4 Drawing Figures

U.S. Patent  June 29, 1976  3,967,000

RISER PROTECTION FOR ANODES

The present invention relates to electrical devices, and more specifically, to electrolytic film-forming metal capacitors and a method of making these capacitors.

A large portion of electrolytic film-forming metal capacitors presently made are tantalum capacitors. The present invention will be discussed with reference to tantalum capacitors although its application is not thereby limited specifically to this type of electrical device.

Tantalum capacitors generally comprise a porous tantalum anode body, a metallic lead or riser projecting from the anode body, a dielectric oxide film over the anode body, a semi-conducting layer over the dielectric oxide film, a conducting layer or layers over the semi-conducting layer, a lead or electrical connection to the conducting layer, and an encapsulating means over the layered anode body. The term "anode" is used herein to include both the porous tantalum anode body and the anode riser.

In the manufacture of tantalum capacitors, tantalum powder is pressed and sintered to provide the porous anode body. Typically, a metallic riser, usually composed of the same metal as the powder, is inserted into the powder during pressing. A dielectric tantalum oxide film is then formed over the porous anode body by immersing the body in an acidic solution such as a weak phosphoric acid solution and applying a voltage potential between the body and a counter-electrode immersed in the solution. This step of forming an oxide film is generally referred to as anodization. The anode is then dipped into a solution of manganese nitrate $[Mn(NO_3)_2]$, and upon removal from the solution is treated with heat and steam to convert or pyrolyze the manganese nitrate contained in solution adhering to the anode to manganese oxide ($MnO_2$), a semiconducting material. This operation is repeated until there is a substantially uniform layer of $MnO_2$ over the anode body. The anode is then coated with graphite or similar material and then dipped in a silver containing paint. The resultant silver coating provides a cathode connection and a subsequent solder coating provides means for attachment of the cathode lead. Typically, the attachment of the cathode lead and the application of the solder coating are accomplished in the same operation. The layered anode, now an operable capacitor, is then encapsulated, usually with a thermoplastic or thermosetting resin.

One major problem in the manufacturing process for tantalum capacitors is that as the anodes are dipped into the $Mn(NO_3)_2$ solution prior to pyrolysis, care must be taken to insure that the anodes are not overdipped, that is, immersed further than the top of the anode. If the anodes are overdipped, a layer of $MnO_2$ may be formed on part of the riser and thereby may materially increase the chances of harmful leakage current being present or even a short being developed when the capacitor is operated within an electrical circuit.

It is very difficult to accurately control how far the anodes are dipped into the solution, especially when very small anodes are being processed continuously in large quantities. One reason is that dipping mechanisms for the anodes cannot be controlled easily to the accuracies required for precise dipping. Another reason is that a plurality of anodes are usually attached to a single fixture for processing and a variance in alignment of the tops of the anode bodies relative to the fixture of several hundredths of an inch is not uncommon. Therefore, some anodes of the fixture may be overdipped in order to adequately dip all the anodes of the fixture. Also the surface of the $Mn(NO_3)_2$ solution may become agitated by ordinary mechanical vibrations and create minute waves which cause at least part of the anode riser to be wetted by the solution. The level of the solution may also change from time to time relative to the anode fixture due to imprecise level control, evaporation, or even the normal loss of solution by entrainment on previously processed anodes. If the anodes are underdipped to compensate for the lack of precise control on the dipping operation, the anode body will not have a complete layer of $MnO_2$ over its total surface and thus will not provide the desired electrical characteristics when used in a capacitor.

In attempts to remedy this problem, various types of materials in a variety of shapes have been affixed to the anode to render the anode riser non-wetting to the manganese nitrate solution and therefore allow for a certain amount of overdipping. Examples of these materials are Mylar sleeves melted or shrunk onto the riser and PTFE washers placed over the riser and on top of the anode. These methods of anode riser protection have not been entirely successful as they are either difficult and time-consuming to apply to the anode riser or they do not, in some instances, prevent a harmful build-up of $MnO_2$ on the riser.

It is therefore a feature of this invention to provide a method for applying a layer containing polytetrafluoroethylene (PTFE) to the anode riser so as to minimize the chances for harmful build-up of $MnO_2$ over the riser. Yet another feature of the invention is that a layer containing PTFE substantially continuous and uniform in thickness is sprayed over the anode riser, preferably, by high pressure spraying. Another feature of the invention is that the layer containing PTFE is applied by dipping the anode in a suspension containing PTFE particles. Yet another feature is that the layer containing PTFE has minimum interference with, if any, other processing steps in the manufacture of the electrical device. Another feature is that the layer containing PTFE over the anode riser does not have to be cured. Another feature of the invention is that the layer containing PTFE provides protection for the riser against mechanical damage during assembly.

These and various other features of this invention as well as many specific advantages will be more fully apparent from a detailed consideration of the remainder of this disclosure including the examples and the appended claims in conjunction with the accompanying drawings, in which;

FIG. 1 of the drawing is cross-section of typical tantalum capacitor anode.

Figure 2:
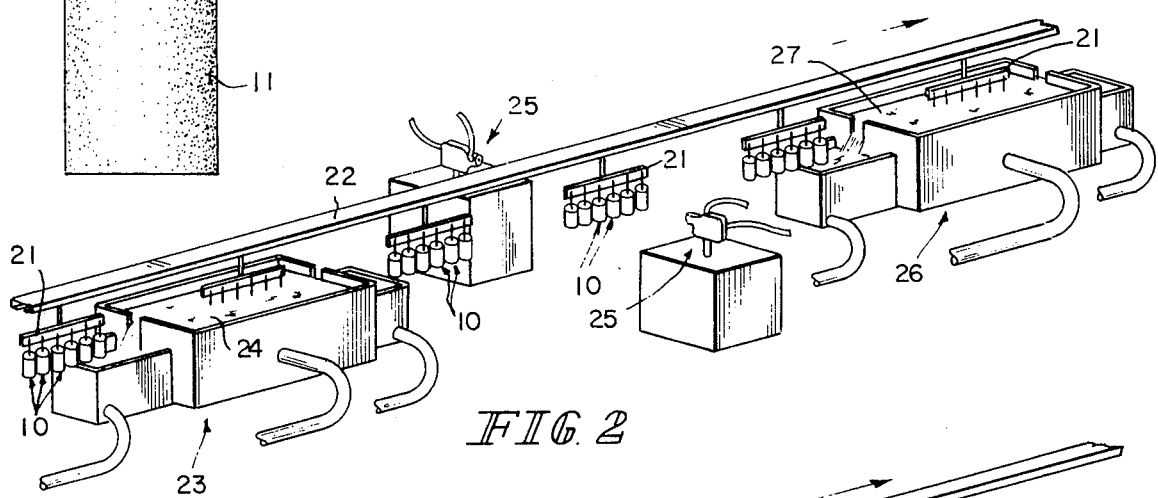
Figure 3:
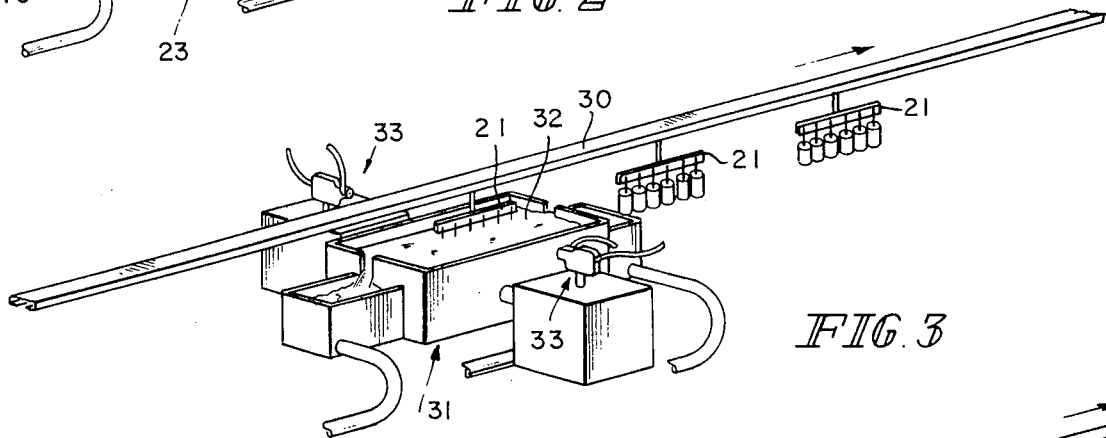

FIGS. 2 and 3 of the drawing illustrate methods for the spraying of a material containing PTFE onto anode risers to form the protective layer.

Figure 4:
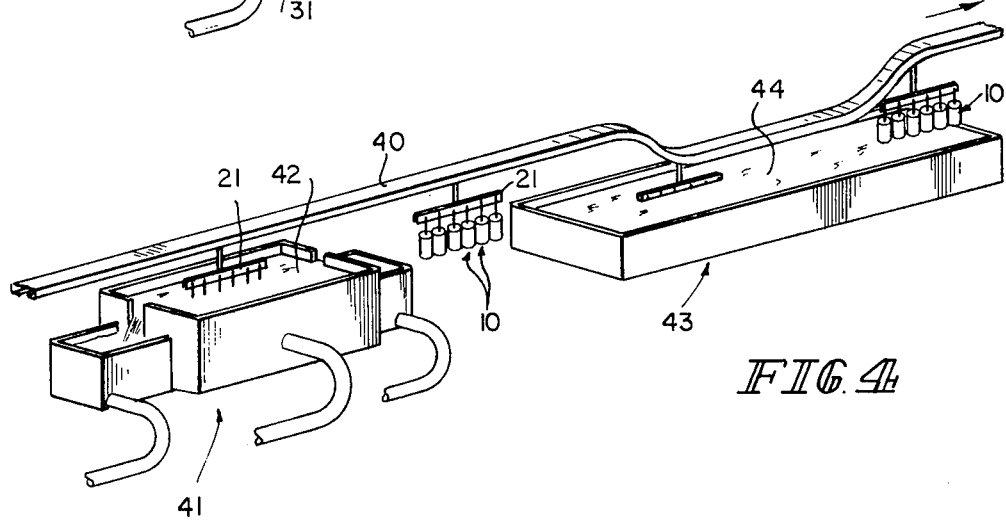

FIG. 4 of the drawing illustrates a method for dipping of anodes in a dispersion containing PTFE to provide protection for the anode risers.

Generally, the present invention relates to a method for the application of a protective layer over the riser of an anode to be used in an electrical device. More specifically, the invention relates to methods for the application of a layer of material containing PTFE over the riser of an anode which is to be used in a capacitor. The layer provides protection for the anode riser during subsequent processing steps including rendering the riser non-wetting to a solution of manganese nitrate in order to help prevent a build-up of $MnO_2$ on the anode riser. According to this invention, a controlled amount of the material containing PTFE may be applied as a layer to the anode riser by either a spraying or a dipping method.

Generally, in order to function effectively, the material used to form the protective layer over the anode risers must be non-wetting to aqueous solutions, must not decompose under the temperature and environmental conditions of pyrolysis and must not harmfully contaminate the anodes.

The invention can be more clearly understood by reference to the drawing. FIG. 1 is a cross-sectional view of a sintered tantalum anode 10 which can be utilized in an electrolytic tantalum capacitor (not shown). The anode 10 includes a sintered tantalum powder anode body 11 and a tantalum riser 12 suitably attached to the body. The approximate area of the riser 12 in need of protection during pyrolysis is that area shown covered by the layer 13 containing PTFE which is applied according to this invention.

FIG. 2 is one embodiment of an apparatus for applying a protective layer to an anode riser according to a method of this invention. Anodes 10, attached to a suitable fixture 21, are anodized (not shown) and then the fixture attached to conveying means 22 and the anodes immersed in a bath 23 of appropriate liquid such as deionized water 24. Liquid 24 will adhere to the porous part of the anode 10, the anode body 11, but will not adhere to the non-porous riser 12. The fixture 21 of anodes 10 is then withdrawn from the liquid 24. The liquid 24 over the anode body 11 helps to mask the body during the step of applying a material containing PTFE to the anode 10. In this embodiment, a spray containing particles of the material entrained in a suitable medium such as a gas is directed toward the anode 10. Particles of the material are deposited over the anode 10 from the material directed toward the anode. Preferably, particles entrained in air are ejected from spray means 25. The anodes 10 are sprayed for a time of about 0.5 seconds to about 5 seconds at a distance of 3-12 inches from the orifice (not shown) of the spray device 25. The ejected material containing polytetrafluoroethylene (PTFE) adheres to the dry anode riser 12 but does not adhere to the wet anode body 11. The liquid over the porous body 11 prevents most contact between the anode body and the ejected material.

After spraying, the anodes 10 are immersed in a liquid rinsing bath 26 which has a laminar flow of water 27 through it. The water flow 27 removes PTFE particles that may have remained on the wet porous anode body 11, but the flow does not remove the material that was deposited on the dry riser 12. The anodes 10 are then ready for further processing steps such as pyrolysis.

FIG. 3 illustrates an alternate method for the application of a protective layer containing PTFE to the riser of an anode by spraying. Again the anodes 10 are suitably attached to a fixture 21 on conveying means 30 and are immersed in a tank 31 which has a laminar flow of liquid, preferably containing water 32 running through it. Preferably the tank 31 is slotted at both ends so that the fixture 21 of anodes 10 can be introduced to the tank at the level of the surface of the liquid 32. The anodes 10 are coated with a material containing particulate PTFE by a spray ejected from spray means 33. The duration of spraying is from about 0.5 seconds and the ejection orifice of the spray means 33 is about 3 inches to about 12 inches distant from the anodes 10. Laminar flow of the liquid 32 through tank 31 helps to sweep away the sprayed particulate PTFE material that settles on the surface of the liquid 32 and thereby helps to prevent PTFE particles from being picked up by the anode body as it is removed from the tank. Upon removal from the tank 31, the anodes 10 are rinsed (not shown) to remove unwanted PTFE material from the anode bodies, if necessary, and then are ready for further processing, including pyrolysis.

The spray means 25 and 33 of FIGS. 2 and 3 may consist of one or more individual spray heads located about the fixture 21 of anodes 10 so as to provide a uniform layer containing PTFE on all portions of the anode riser 12 during the spraying operation. One of the simplest spray means is a fixtured aerosol spray can containing the desired particulate PTFE material carried by a suitable propellant.

In the two embodiments illustrated in FIGS. 2 and 3, the material sprayed is a dispersion of particulate polytetrafluoroethylene and an organic carrier fluid or propellant such as gaseous fluorinated hydrocarbons. This combination of materials is commercially available as aerosols under various tradenames, such as Fluoro-Glide and Fluo-Kem, products of Chemplast Inc. Wayne, N.J. and Bel-Art Products, Pequannock, N.J. respectively. No film bonding modifiers or bonding agents should be included in the dispersion to be sprayed as most modifiers have temperature limits below the temperature required for pyrolysis and the dispersion must be heat cured.

The protective layer formed on the anode riser 12 may be very thin, almost invisible to the unaided eye. Thicker layers can be formed by longer spray times or multiple spray passes, but are not generally required for riser protection.

A preferred method of coating the anode risers utilizes high pressure spraying of the PTFE containing material. By spraying with pressures of at least several hundred psi, a higher degree of adherance to the anode riser and between the PTFE particles themselves is achieved than at lower spraying pressures. It is believed that the PTFE particles are propelled to such a velocity by the high pressures that they deform plastically upon impact with the anode riser to form an adherent layer. With lower pressure spraying, the protective layer appears to have little, if any, adherance to the anode riser itself as the layer appears to be mechanically dislodged quite easily even though it is not harmfully affected by contact with liquids such as water or a $Mn(NO_3)_2$ solution.

Another method of application of the protective layer of material containing PTFE to an anode riser is by dipping the anode into a liquid suspension containing particulate PTFE as shown in FIG. 4. A fixture 21 of anodes 10 on conveying means 40 is first immersed in tank 41 containing water 42 and then is slowly removed from tank. Water 42 is retained on the porous anode body 11 but the anode riser 12 is not wet by the water. The anodes 10 are then completely immersed into bath 43 which contains a dispersion 44 of PTFE particles and an organic vehicle which is immiscible in water such as toluene. Upon removal from bath 43, the anode riser 12 will have a thin layer of material containing PTFE adhering to it while there will be little, if any, material on the anode body 11 due to the retained water 42 from tank 41 acting as a mask. Any material residues on the anode body 11 may be rinsed off in a stream of water (not shown) without affecting the layer containing PTFE on the anode riser 12. The anode 10 is then ready for further processing steps.

Thus, the present invention comprehends a method for the application of a layer containing PTFE to the riser portion of an anode to be used in an electrical device. The layer containing PTFE over the anode riser helps to prevent the build-up of $MnO_2$ on the riser during pyrolysis and helps to prevent mechanical damage to the anode during assembly of an electrical device which incorporates the anode.

While the present invention has been described with reference to particular embodiments thereof, it will be understood that numerous modifications may be made by those skilled in the art without actually departing from the spirit and scope of the invention as defined in the appended claims.

We claim:

1. A method of applying a layer of material containing polytetrafluorethylene over a riser of an anode adapted for use in an electrical device comprising providing an anode comprising a body including electrically conducting material and a riser projecting from the body, masking the anode body with a liquid, directing particles of a material consisting essentially of polytetrafluorethylene entrained in a medium toward the anode, and depositing particles of said material over the anode riser, said masking liquid being of such a nature that said particles will not adhere to the anode body.

2. A method according to claim 1, wherein the anode body is masked by dipping the anode into a liquid containing water prior to the step of depositing particles of material over the anode.

3. The method of claim 2, wherein excess material on the anode body is removed by rinsing subsequent to depositing the particles of material over the anode.

4. The method of claim 1, wherein the anode body is masked by applying water to the anode body.

5. The method of claim 4, wherein the directing of particles of material is done under pressure sufficient for the material particles to deform upon impact with the anode.

6. A method of applying a layer of material containing polytetrafluoroethylene over a riser of an anode adapted for use in an electrical device comprising providing an anode comprising a porous anode body including electrically conducting material and a metal riser projecting from the body, applying a liquid to the anode, and applying to the anode a suspension containing particulate polytetrafluoroethylene and an organic liquid which is immiscible with the liquid, the liquid being of such a nature that the particulate polytetrafluoroethylene will not adhere to the anode body.

7. The method of claim 6, wherein excess material on the anode body is removed by rinsing after the step of applying the suspension.

8. The method of claim 6, wherein the liquid and the suspension are applied by dipping and the liquid consists predominantly of water.

* * * * *